Patented June 5, 1923.

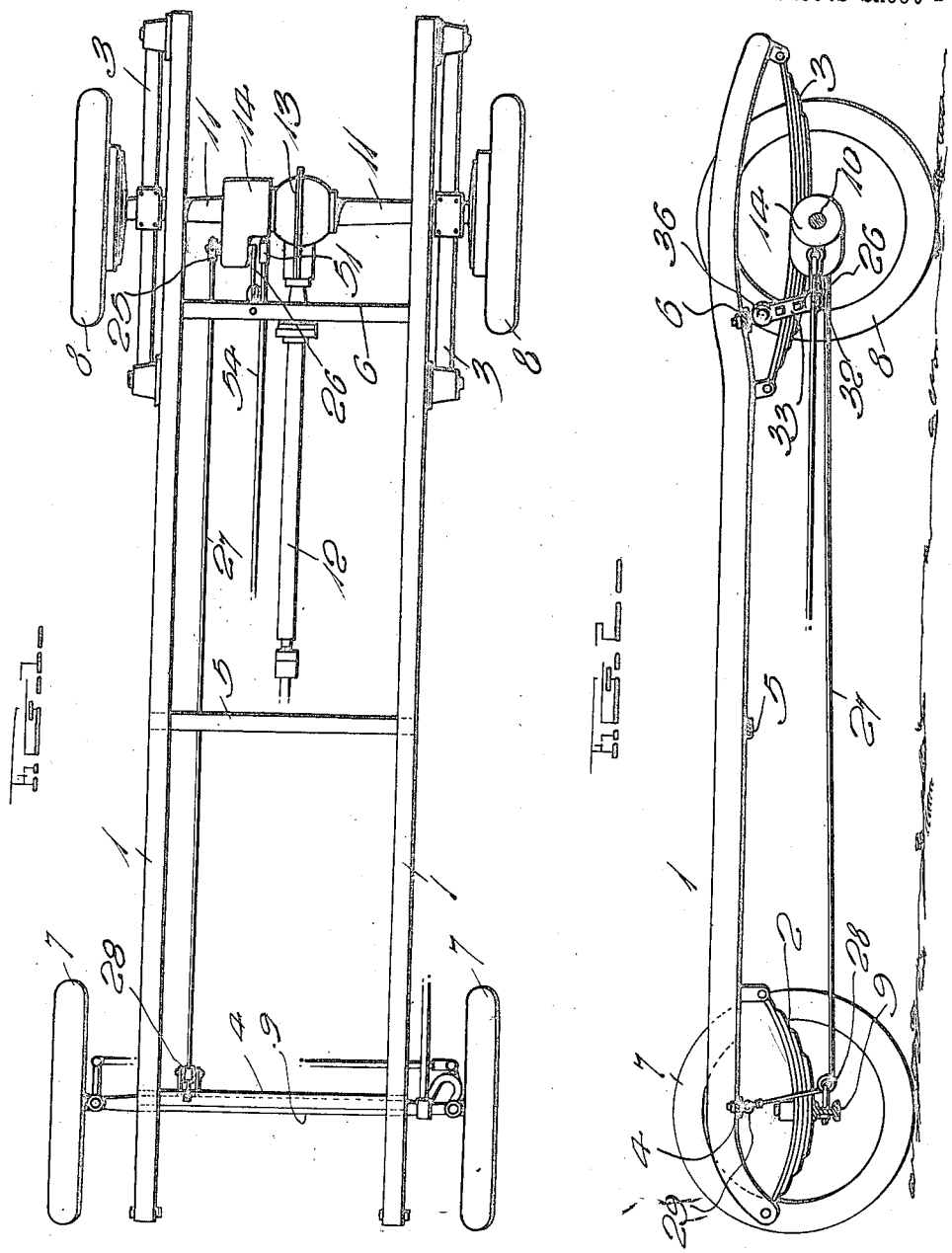
June 5, 1923.
G. R. RICHARDSON
TRANSMISSION ATTACHMENT
Filed July 27, 1922
1,458,003
3 Sheets-Sheet 1
Witness
H. Woodard
Inventor
G. R. Richardson
By
Attorneys

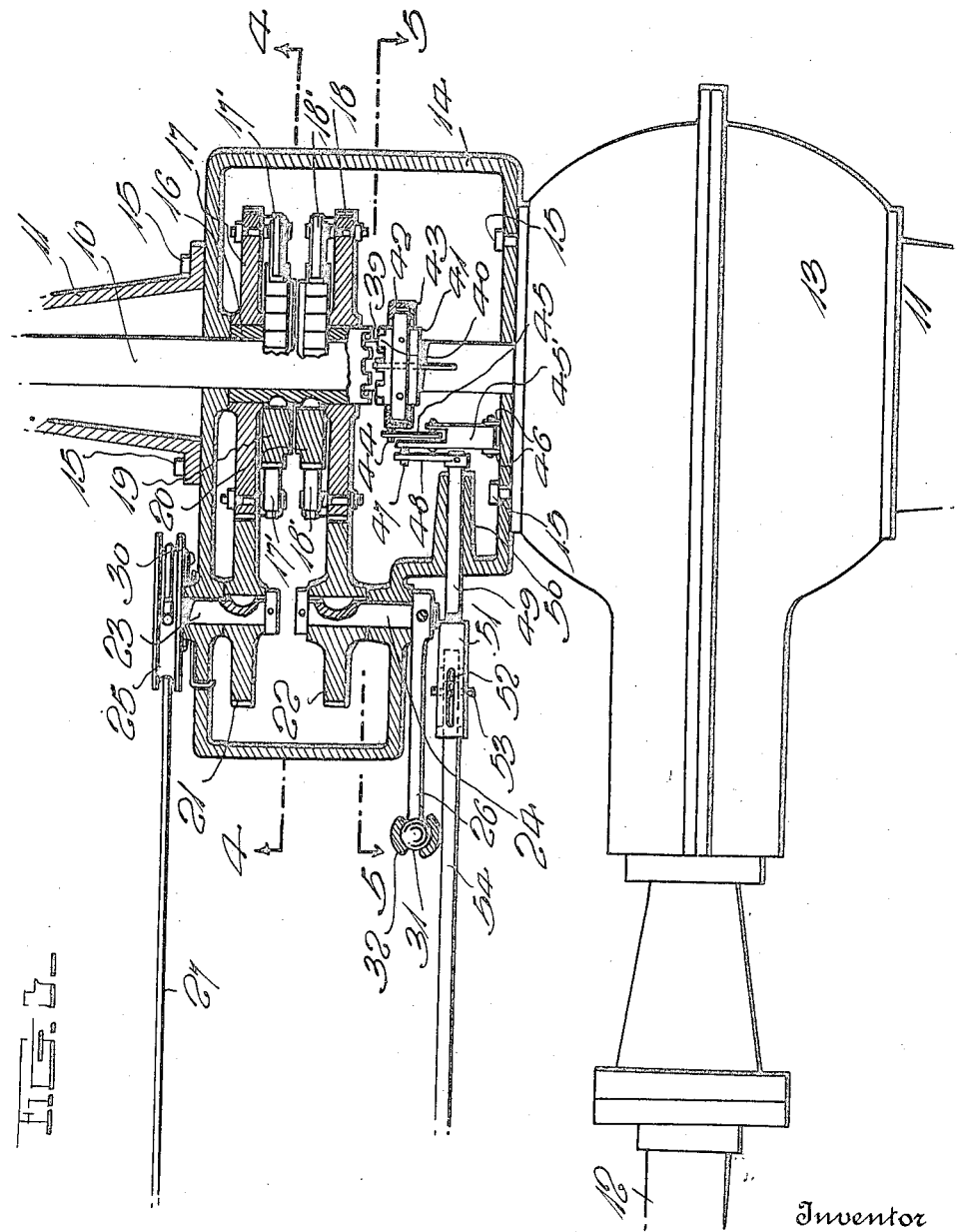

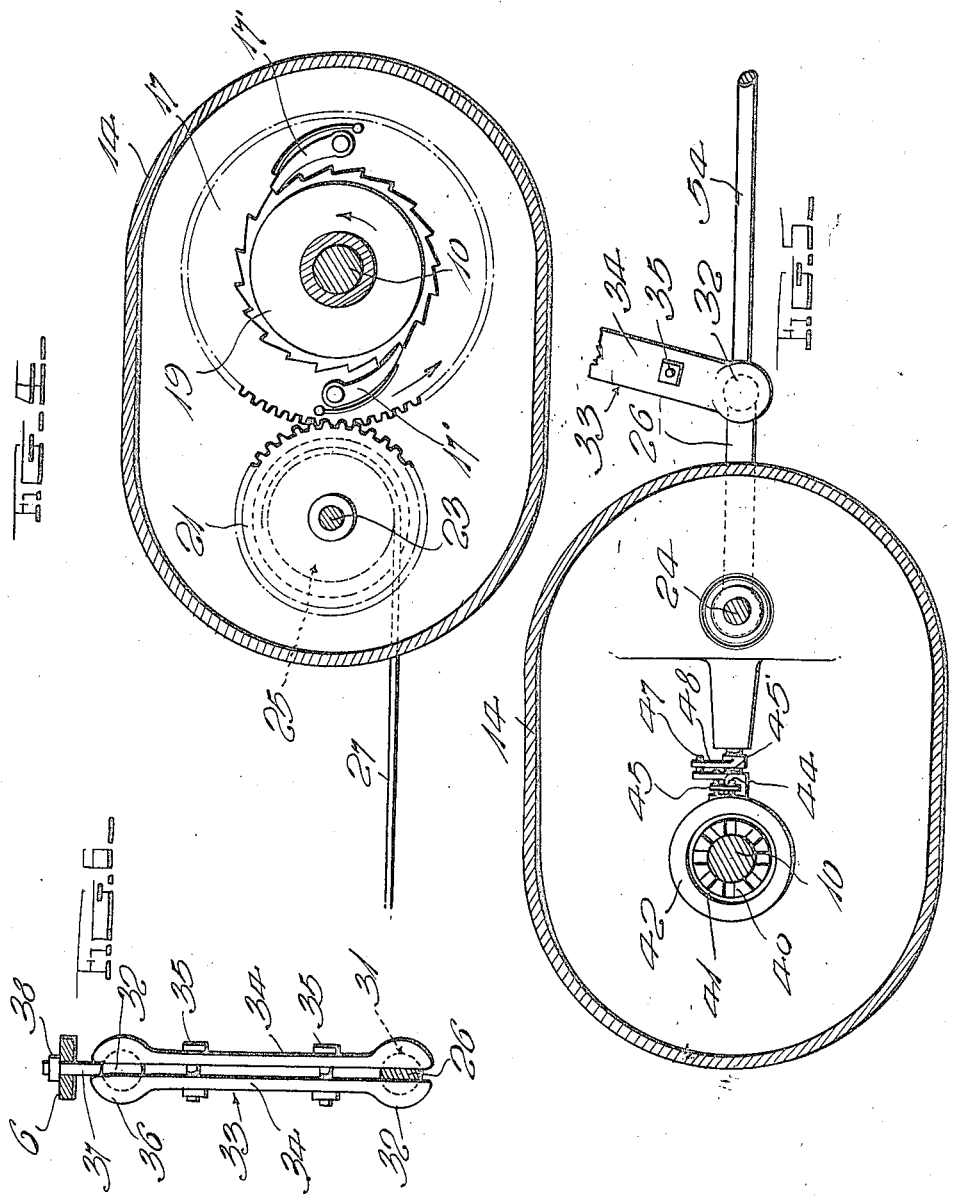

1,458,003

UNITED STATES PATENT OFFICE.

GEORGE R. RICHARDSON, OF GREENE, NORTH DAKOTA.

TRANSMISSION ATTACHMENT.

Application filed July 27, 1922. Serial No. 577,977.

*To all whom it may concern:*

Be it known that I, GEORGE R. RICHARDSON, a citizen of the United States, residing at Greene, in the county of Renville and State of North Dakota, have invented certain new and useful Improvements in Transmission Attachments; and I do declare the following to be a full, clear, and exact description of the invention, such as will enable others skilled in the art to which it appertains to make and use the same.

This invention relates to an improved attachment for use in connection with a driven axle section so that as the vehicle chassis and body moves vertically in going over rough places in a road, rotary movement may be imparted to the driven axle and thus power imparted to the axle to move the automobile forwardly.

Another object of the invention is to so construct this device that the portion mounted upon the driven axle may be enclosed in a housing which is positioned between the differential housing of the transmission and the casing of the axle section.

Another object of the invention is to so construct this attachment that it may serve as means for retarding rebound or in other words upward movement of the chassis and vehicle body and thus prevent jolting of the occupants of the car when going over rough roads.

Another object of the invention is to so construct this attachment that it may be acutated either from the forward end portion of the chassis or the rear end portion and to further so construct it that operation of the means actuated from one end of the chassis will not effect the means actuated from the other end of the chassis.

Another object of the invention is to so construct this attachment that a sleeve forming part of the attachment may be turned upon the axle by the vehicle chassis operated means or caused to turn with the axle by means including elements carried by the sleeve and axle, this last mentioned means including pawl and ratchet mechanism which will permit the axle to turn rearwardly when the automobile is being backed without danger of breakage to any of the parts.

This invention is illustrated in the accompanying drawings, wherein:

Figure 1 is a view showing a chassis in top plan with the improved attachment in place.

Figure 2 is a longitudinal sectional view through the chassis.

Figure 3 is an enlarged fragmentary view showing the attachment in longitudinal horizontal section.

Figure 4 is a longitudinal sectional view taken along the line 4—4 of Fig. 3.

Figure 5 is a longitudinal sectional view taken along the line 5—5 of Fig. 3.

The chassis which is shown is of a conventional construction and provided with the usual chassis bars 1 which are connected with the forward and rear springs 2 and 3 and are connected by cross bars 4, 5 and 6. The usual wheels 7 and 8 are provided, the front wheels 7 being carried by the usual forward axle 9 and the rear wheels being carried by the axle section 10 which extends through the axle casing 11 and is driven in the usual manner by a conventional structure of transmission which includes the shaft 12 and transmission indicated in general by the numeral 13. The structure so far described is a conventional structure and since no claim is made to the same, it is to be understood that any other suitable structure of chassis may be employed which may be substituted for that specifically shown.

The attachment is provided with a housing 14 which is positioned about one of the driven axle sections 10 between the differential housing and the axle housing or casing. The housing 14 is securely held in place by the bolts 15 and it will be seen that this housing will be firmly held in place and thus prevented from having movement about the axle section. A sleeve 16 fits upon the axle section 10 within the housing 14 and carries gears 17 and 18 which are loose upon the sleeve and are provided with pawls 17' and 18' which are yieldably held in engagement with ratchet wheels 19 and 20 rigidly held against rotation upon the sleeve. From an inspection of Fig. 4, it will be readily seen that when one of the large gears loosely mounted upon the sleeve is rotating in the direction of the arrow, the sleeve will be turned with it whereas when the gears are turning in a reverse direction, the pawls will slip past the teeth of the ratchet without imparting rotary movement to the sleeve. These gears 17 and 18 mesh with smaller gears 21 and 22 which are keyed to the drive shafts 23 and 24 journaled in bearings formed in the side walls of the housing 14. A drum 25 is carried by the outer end portion of the shaft 23 and a crank arm 26 is carried by and extends radially from the outer end portion of the shaft 24. A cable 27 has one end portion partially wound upon the drum 25 and extends forwardly beneath the chassis and has its forward end portion engaged with a guide pulley 28 carried by the front axle and then carried upwardly and connected with an eye 29 carried by the cross bar 4 which connects the forward end portions of the side bars 1 of the chassis. It will be readily seen that when the automobile body moves downwardly in going over a rough road, the cable 27 will be released from pulling action and that as the body rebounds and moves upwardly, the cable will be drawn upon and will rotate the drum and shaft 23. A spring 30 is coiled about the bearing for the shaft 23 and has one end anchored to the side wall of the housing 14 and its other end portion connected with the drum so that when the vehicle body moves downwardly, the spring will tend to rotate the drum and wind the cable upon it. During this turning of the drum by the spring, the gears 21 and 17 will be rotated so that the pawls 17' move over the ratchet teeth of the ratchet 19. As the vehicle body moves upwardly, the cable will be drawn upon and the drum and shaft rotated to rotate the gears 21 and 17 in the direction of the arrow in Fig. 4 and impart rotary movement to the sleeve. When the shaft 24 is rotated first in one direction and then in the other, a similar action takes place. This shaft 24 has its crank arm 26 provided with an enlarged and spherical end 31 which fits into the socket 32 formed at the lower end of the pitman 33. This pitman 33 is formed of two plates 34 as shown in Fig. 6 which are connected by bolts 35 so that they may be drawn towards each other into proper engagement with the ball 31 and into proper engagement with the ball 32 which is positioned in the socket 36 formed at the upper end of the pitman and provided with a stem extension 37 which passes through an opening formed in the cross bar 6 and carries a retainer nut 38 at its upper end. When the rear end portion of the automobile body moves downwardly and then upwardly when going over rough places in a road, the pitman is moved to impart oscillating movement to the crank arm 26 and rotate the shaft 24 first in one direction and then in the other in the same manner that the shaft 23 is rotating. It will thus be seen that when going over rough roads, movement of the body will serve to impart rotary movement to the sleeve and further that upward or in other words rebound movement of the body is retarded and thus jolting of the occupants of the automobile prevented.

In order to permit the shaft or axle 10 to be rotated when the sleeve is rotated through the medium of the gear 17 or gear 18, the sleeve 16 has its end provided with gear teeth as shown at 39. These clutch teeth are to be engaged by the co-operating clutch teeth 40 of the clutch sleeve or drum 41 which is slidably mounted upon a squared portion of the shaft or axle 10. By having this clutch sleeve slidably fitting upon a squared portion of the axle, the clutch sleeve will be turned with the axle but may be moved longitudinally thereof into and out of engagement with the clutch teeth of the sleeve 16. When this clutch sleeve is in engagement with the clutch teeth of the clutch collar of the sleeve 16, rotation of the sleeve 16 by vertical movement of the vehicle body will cause rotary movement to be imparted to the axle but when the clutch collar is out of an operative position, rotation of the axle through the medium of the gears 17 and 18 will be prevented. It is desired to permit the clutch collar to be moved into and out of an operative position according to the wishes of the operator of the car and therefore there has been provided manually operated means for adjusting the position of the clutch collar. In order to do so, there has been provided a ring 42 which fits loosely upon the clutch collar and carries a completing ring or flange 43 removably secured by suitable fasteners. This ring 42 carries a side arm or pin 44 which fits loosely in an opening in a pitman 45 pivotally connected with a lever 45' which in its turn is pivotally mounted by means of bearing brackets 46 carried by the end wall of the housing 14 through which the fastener bolts 15 pass. This pitman 45 is pivotally mounted intermediate the length of the lever 45' and the lever 45' has its free end portion provided with a side arm or pin 47 which fits loosely into an opening formed in the free end portion of a side arm 48 carried by a shaft 49. This shaft 49 is journaled in a bearing 50 and extends forwardly to one side of the crank arm 26 and terminates in a head or socket portion 51 which is rectangular and provided with longitudinally extending slots 52 to receive pins 53 carried by an actuating shaft 54. This shaft 54 extends forwardly from the head 51 of the shaft 49 and will be rotatably held in engagement with the chassis of the automobile by suitable bearings. It will be readily seen that when this actuating shaft is rotated by the operator of the car placing his foot upon a suitable actuating treadle for the shaft, the shaft 49 will be rotated and the side arm 48 swung in the arc of a circle. Swinging of this side arm 48 causes the lever 45' to swing downwardly thus projecting the pitman 45 longitudinally of the shaft or axle 10 to move the clutch collar or drum into operative engagement with the clutch teeth 39 of the sleeve 16. As long as the treadle is retained in the lowered position, the clutch 41 will remain in engagement with the clutch teeth of the sleeve and when the gears 17 and 18 are rotated as previously brought out, rotary movement will be imparted to the rear shaft and tend to move the automobile forwardly. When the treadle is permitted to move upwardly, a reverse operation will take place and the shaft 49 will rotate to swing the side arm 48 upwardly and move the lever 45' to draw upon the pitman 45 and thus move the clutch out of engagement with the clutch teeth of the sleeve. The structure can therefore be manually controlled so that the driver of the automobile can have the device operate or remain inoperative.

I claim:

1. A structure of the character described comprising a driven axle, a sleeve loose on said axle, means actuated by a vertically moving vehicle chassis for imparting rotary movement to the sleeve while the vehicle body is moving vertically in one direction and retarding movement of the chassis in the said direction, and manually controlled means movable into and out of position for permitting transmission of rotary movement from said sleeve to said axle.

2. A structure of the character described comprising a housing, a driven axle extending through the housing, a sleeve loose on the axle, vehicle chassis actuated means for imparting rotary movement to the sleeve including a ratchet rigidly carried by the sleeve, a driven gear loose upon the sleeve, pawls carried by the gear and yieldably engaging the ratchet, a driven shaft journaled in the wall of the housing, a gear carried by the shaft and engaging the gear of the sleeve, means carried by the shaft for turning the shaft and engaged by an element adapted for connection with a vehicle body whereby the shaft may be rotated during vertical movement of the vehicle, and means for transmitting rotary movement from the sleeve to the axle.

3. A structure of the character described comprising a housing, a driven axle extending through the housing, a sleeve loose on the axle, vehicle chassis actuated means for imparting rotary movement to the sleeve including a ratchet rigidly carried by the sleeve, a driven gear loose upon the sleeve, pawls carried by the gear and yieldably engaging the ratchet, a drive shaft journalled in the wall of the housing, a gear carried by the shaft and engaging the gear of the sleeve, means carried by the shaft for turning the shaft and engaged by an element adapted for connection with a vehicle body whereby the shaft may be rotated during vertical movement of the vehicle body, and means for transmitting rotary movement from the sleeve to the axle.

4. A structure of the character described comprising a driven axle, a sleeve loose upon the axle, a ratchet rigid upon the sleeve, a gear loose upon the sleeve adjacent the ratchet and provided with a pawl yieldably held in engagement with the ratchet, means for imparting oscillating movement to the gear and through the medium of the pawl imparting rotary movement to the ratchet and sleeve when the gear is turning in one direction, a clutch element slidable upon the axle and movable into and out of engagement with co-operating clutch means of said sleeve, and means for moving the clutch element into and out of an operative position.

5. The structure of claim 2 having the vehicle chassis actuated means for rotating the drive shaft consisting of a drum rigidly carried by the drive shaft, a spring engaging the drum to yieldably hold the drum and shaft against rotation in one direction, and a cable connected with the drum and adapted for connection with the chassis of a vehicle to rotate the drum against the action of the spring when drawn upon by the vehicle chassis moving vertically in one direction.

6. The structure of claim 2 having the vehicle chassis actuated means for rotating the drive shaft consisting of a crank arm carried by and extending radially from the drive shaft, a pitman loosely connected with the crank arm, and an attaching member loosely carried by the pitman and adapted for connection with the vehicle chassis.

7. The structure of claim 1 having the sleeve provided at one end with clutch teeth, a clutch collar slidable upon the axle and held against rotation thereon, a shaft rotatably mounted, and means actuated by said shaft for moving the clutch collar longitudinally of the axle into and out of operative engagement with the clutch teeth of said sleeve when the shaft is rotated.

8. The structure of claim 1 having the sleeve provided at one end with clutch teeth, a clutch collar slidable upon the axle and held against rotation thereon, a shaft rotatably mounted, and means actuated by said shaft for moving the clutch collar longitudinally of the axle into and out of operative engagement with the clutch teeth of said sleeve when the shaft is rotated, said means consisting of a lever pivotally mounted for vertical swinging movement, a ring loose upon said clutch collar and provided with a side pin, a pitman pivotally connected with said lever intermediate the length thereof and having its free end portion provided with an opening receiving the side pin of said ring, a rotatable shaft having one end portion provided with a hollow head having longitudinally extending slots for receiving pins extending from the first mentioned shaft, a side arm extending from the last mentioned shaft, and a side pin carried by said lever and fitting into an opening formed in the last mentioned side arm.

In testimony whereof I have hereunto set my hand.

GEORGE R. RICHARDSON.